(12) United States Patent
Auffinger et al.

(10) Patent No.: US 10,982,704 B2
(45) Date of Patent: Apr. 20, 2021

(54) EME PROTECTION CAP SYSTEM WITH SCREW SEALANT MECHANISM

(71) Applicant: THE BOEING COMPANY, Chicago, IL (US)

(72) Inventors: Sean Auffinger, Ladson, SC (US); Bart Stevens, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 300 days.

(21) Appl. No.: 16/238,768

(22) Filed: Jan. 3, 2019

(65) Prior Publication Data

US 2020/0217348 A1    Jul. 9, 2020

(51) Int. Cl.
| F16B 33/00 | (2006.01) |
| B64D 45/02 | (2006.01) |
| F16B 37/14 | (2006.01) |

(52) U.S. Cl.
CPC ............ *F16B 33/004* (2013.01); *B64D 45/02* (2013.01); *F16B 37/14* (2013.01); *F16B 33/00* (2013.01)

(58) Field of Classification Search
CPC ........ F16B 33/00; F16B 33/004; F16B 37/14; F16B 41/005; Y10S 411/91; F22B 7/16; B64D 45/02
USPC ............................. 411/372.5, 372.6, 373, 374
See application file for complete search history.

(56) References Cited

U.S. PATENT DOCUMENTS

| 1,368,637 A | 2/1921 | McFarland |
| 1,868,084 A | 7/1932 | Wheelwright |
| 3,699,368 A | 10/1972 | Palmer |
| 4,013,190 A | 3/1977 | Wiggins et al. |
| 4,295,766 A | 10/1981 | Shaw |
| 4,519,974 A | 5/1985 | Bravenec et al. |
| 4,630,168 A | 12/1986 | Hunt |

(Continued)

FOREIGN PATENT DOCUMENTS

| CA | 2856687 A1 | 3/2015 |
| CA | 2858461 A1 | 3/2015 |

(Continued)

OTHER PUBLICATIONS

Drawings of Boeing Part Standard, BACC50AP, dated Feb. 2, 2017, 2 pgs.

(Continued)

*Primary Examiner* — Roberta S Delisle
(74) *Attorney, Agent, or Firm* — Marshall, Gerstein & Borun LLP

(57) ABSTRACT

A containment cap assembly for enclosing a metallic fastener extending through a structure includes an inner cap with a projection extending from an outer surface of the inner cap and an outer cap includes a first end which defines an opening and includes an inner surface which defines a first space within the outer cap in communication with the opening. A dimension of the opening and of the first space defined by the inner surface of the outer cap are each greater than a dimension defined by the outer surface of the inner cap such that with positioning the inner cap within the outer cap, a second space is defined between the outer cap and the inner cap. A slot of the outer cap extends first curvilinear direction such that the projection positioned within the slot moves along first curvilinear direction with moving the inner cap into the outer cap.

20 Claims, 7 Drawing Sheets

(56) References Cited

U.S. PATENT DOCUMENTS

| | | | |
|---|---|---|---|
| 4,636,446 A | 1/1987 | Lee | |
| 4,826,380 A | 5/1989 | Henry | |
| 4,850,778 A | 7/1989 | Clough et al. | |
| 4,884,933 A | 12/1989 | Preusker et al. | |
| 5,108,853 A | 4/1992 | Feres | |
| 5,350,266 A | 9/1994 | Espey et al. | |
| 5,749,690 A * | 5/1998 | Kutz | |
| 5,752,794 A | 5/1998 | Krawczak | |
| 6,053,683 A | 4/2000 | Cabiran | |
| 6,102,128 A | 8/2000 | Bridgeman | |
| 6,318,942 B1 | 11/2001 | Wieczorek | |
| 7,134,666 B2 | 11/2006 | Beyssac et al. | |
| 7,755,876 B2 | 7/2010 | Morrill et al. | |
| 7,918,081 B2 | 4/2011 | Schlichting et al. | |
| 7,936,550 B2 | 5/2011 | Morrill et al. | |
| 8,318,942 B2 | 11/2012 | Zhang | |
| 8,388,293 B2 | 3/2013 | Hutter, III | |
| 8,711,541 B2 | 4/2014 | Umemoto et al. | |
| 8,717,735 B2 | 5/2014 | Day et al. | |
| 8,717,736 B2 | 5/2014 | Asahara et al. | |
| 8,840,740 B2 | 9/2014 | Rorabaugh et al. | |
| 8,894,338 B2 | 11/2014 | Dobbin et al. | |
| 9,011,062 B2 * | 4/2015 | Chirol | F16B 33/02 411/372.5 |
| 9,133,874 B2 | 9/2015 | Hill | |
| 9,188,226 B2 | 11/2015 | Pajel et al. | |
| 9,228,604 B2 | 1/2016 | Dobbin | |
| 10,151,337 B2 | 12/2018 | Hill | |
| 2002/0192052 A1 | 12/2002 | Ruspa | |
| 2008/0137259 A1 | 6/2008 | Heeter et al. | |
| 2009/0194297 A1 | 8/2009 | Ortiz Teruel | |
| 2010/0303582 A1 | 12/2010 | Choi et al. | |
| 2012/0217673 A1 | 8/2012 | Hutter, III | |
| 2012/0219380 A1 * | 8/2012 | Hutter, III | B64D 45/02 411/377 |
| 2013/0206759 A1 | 8/2013 | Wurz et al. | |
| 2013/0223951 A1 | 8/2013 | Bessho et al. | |
| 2013/0322982 A1 * | 12/2013 | Dobbin | F16B 37/14 411/82 |
| 2014/0048198 A1 | 2/2014 | Dobbin et al. | |
| 2014/0261956 A1 | 9/2014 | Wiseman et al. | |
| 2014/0321944 A1 * | 10/2014 | Chirol | F16B 37/14 411/375 |
| 2014/0341675 A1 | 11/2014 | Dobbin | |
| 2015/0060465 A1 | 3/2015 | Limbacher et al. | |
| 2015/0082603 A1 | 3/2015 | Rawdon et al. | |
| 2015/0086295 A1 | 3/2015 | Cameron et al. | |
| 2015/0184688 A1 | 7/2015 | Dobbin et al. | |
| 2015/0345533 A1 | 12/2015 | Hill | |
| 2016/0131179 A1 | 5/2016 | Prouty et al. | |
| 2017/0021209 A1 | 1/2017 | Damazo et al. | |
| 2020/0158158 A1 * | 5/2020 | Auffinger | F16B 37/14 |

FOREIGN PATENT DOCUMENTS

| | | |
|---|---|---|
| DE | 1085586 B | 7/1960 |
| EP | 2610506 A1 | 7/2013 |
| EP | 2713065 A2 | 4/2014 |
| EP | 2812248 A1 | 12/2014 |
| EP | 2860410 A1 | 4/2015 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| EP | 3287362 A1 | 2/2018 |
| EP | 3462046 A1 | 4/2019 |
| GB | 612381 A | 11/1948 |
| JP | H02102910 A | 4/1990 |
| JP | H03125911 U | 12/1991 |
| JP | H08-145032 A | 6/1996 |
| JP | 2000039010 A | 2/2000 |
| JP | 2001165138 A | 6/2001 |
| JP | 2002266832 A | 9/2002 |
| JP | 2004169853 A | 6/2004 |
| RU | 2014128760 A | 2/2016 |
| WO | WO-9729289 A1 | 8/1997 |
| WO | WO-0057069 A1 | 9/2000 |
| WO | WO 2009063063 A1 | 5/2009 |
| WO | WO-2012147645 A1 | 11/2012 |
| WO | WO-2012170672 A1 | 12/2012 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2014184722 A1 | 11/2014 |
| WO | WO-2015015153 A1 | 2/2015 |
| WO | WO-2015025130 A1 | 2/2015 |

OTHER PUBLICATIONS

Photographs of Boeing Proprietary, Zap Cap Further Screening Test Plan for 787 Fuel Tank Use, Mar. 24, 2016, 1 pg.

Extended EP Search Report for EP Application No. 19204019.4 dated Mar. 30, 2020.

Written Opinion for EP Application No. 19204019.4 dated Mar. 30, 2020.

Extended European Search Report for EP Application No. 20176033.7 dated Oct. 23, 2020.

Novaria/ESNA Design, dated Jul. 14, 2017, 3 pgs.

Boeing Part Standard, BACC50AP, dated Feb. 2, 2017, 16 pgs.

Click Bond Cap dated May 16, 2016, 4 pgs.

European Search Report for EP Application No. EP19217717 dated May 8, 2020.

Extended EP Search Report for EP Application No. 19207962.2 dated Mar. 26, 2020.

Toulouse, Mixed Metal-Composite Assembly, May 2013.

Boeing Proprietary, Zap Caps as Alternative to Seal Caps—Task No. 17728-01, dated Aug. 19, 2016, 30 pages.

Boeing Proprietary, Zap Cap Further Screening Test Plan for 787 Fuel Tank Use, Mar. 24, 2016, 24 pages.

Hutchinson Proprietary Document, Accessories: TP Nutcaps, 1 page.

http://www.ppgaerospace.com/getmedia/9a234ec3-1db9-48de-94f7- c212ac2ba705/SealCapFlyer.pdf.aspx, PPG Aerospace PRC Seal Caps, retrieved Sep. 7, 2016.

http://www.porex.com/files/documents/Porex-Battery-Vents-Letter---English, Porex Battery Vents, 2013.

Extended European Search Report for foreign counterpart EP Application No. 16173069, dated Nov. 17, 2016.

Product Literature for ERG Duocel Aluminum Foam, downloaded from ERO Aerospace website, www.ergaerospace.com/literature/erg_duocel.pdf, Jul. 9, 2015.

"HRL Researchers Develop World's Lightest Material," downloaded from HRL Laboratories website, www.hrl.com/hrlDocs/pressreleases/2011/prsRls_111117, Jul. 10, 2015.

Daniel J. Cowan et al., U.S. Appl. No. 15/964,340, filed Apr. 27, 2018.

Bart Stevens et al., U.S. Appl. No. 15/718,618, filed Sep. 28, 2017.

Bart Stevens et al., U.S. Appl. No. 15/960,835, filed Apr. 24, 2018.

Sean Auffinger et al., U.S. Appl. No. 16/046,316, filed Jul. 26, 2018.

Office Action for RU Application No. 2018127328/07 dated May 20, 2019.

EP Search Report for EP Application No. 19167831.7 dated Aug. 29, 2019.

EP Search Report for Application No. EP19166688 dated Aug. 29, 2019.

EP Office Action for Application No. 19166688.2 dated Sep. 20, 2019.

European Search Report for Application No. 19179944.4 dated Sep. 10, 2019.

Communication Pursuant to Article 94(3) dated Oct. 16, 2019.

Extended European Search Report for EP Application No. 18196707.6 dated Feb. 19, 2019.

EP Search Report for Application No. EP14175808 dated Mar. 6, 2015.

(56) References Cited

OTHER PUBLICATIONS

PRC-Desoto International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.
Porex Corporation, "Porex(R) Battery Vents—Flame Arrestors," Porex Advanced Porous Materials, PXT-621-080513-00, Jan. 1, 2013, pp. 1-2, retrieved on Dec. 4, 2018, retrieved from internet: http://www.porex.com//files/documents/POREX-Battery-Vents--Letter-for-Web.pdf.
"Customized Sealants Solutions: PRC® Seal Caps," PPG Aerospace, product literature downloaded from ppaerospace.com on Sep. 7, 2016.
"HRL Researchers Develop World's Lightest Material," downloaded from HRL Laboratories website, HRL.com on Jul. 10, 2015.
"ERG Duocel® aluminum foam," product literature downloaded from ERG Aerospace website, ERGaerospace.com on Jul. 9, 2015.

\* cited by examiner

EME PROTECTION CAP SYSTEM WITH SCREW SEALANT MECHANISM

FIELD

This disclosure relates to an electrical insulation containment apparatus which electrically insulates a metallic fastener from transmitting electrical current or sparks into a vicinity of the metallic fastener upon an occurrence of an electromagnetic effect ("EME") or lightning strike event and more particularly to a cap assembly used in conjunction with a sealant.

BACKGROUND

In fabricating assemblies, such as for example an aircraft, cap assemblies are used to enclose a metallic fastener which extends through a structure of the assembly being fabricated. Enclosing the metallic fastener with the cap assembly protects the vicinity in which the metallic fastener is located by insulating the metallic fastener from transmitting any current or electrical spark from the metallic fastener into the vicinity within the fabricated assembly such as the aircraft upon an occurrence of an electromagnetic effect ("EME") or lightning strike event.

In the installation of cap assemblies to electrically isolate a metallic fastener, the cap assembly is filled with uncured sealant and the cap assembly is then placed over the metallic fastener. The uncured sealant tends to expand with the cap assembly installed over the metallic fastener. The expansion of the uncured sealant tends to lift off the cap assembly from a surface of a structure through which the metallic fastener extends and the cap assembly abuts in enclosing the metallic fastener. Cap assemblies which have experienced lift off are reinstalled enclosing the metallic fastener. Reinstallation increases the cost of providing electrical isolation of the metallic fasteners in the fabrication of an assembly such as an aircraft.

In addition, sealant can be constructed from high density material and with the cap assembly internal volume being filled with this high density material additional weight is added to the fabricated assembly such as an aircraft. The additional weight to the aircraft can result in an increase in cost of operation of the aircraft.

There is a need for cap assemblies which will provide electrical isolation of a metallic fastener and will to avoid unnecessary additional weight being added to the aircraft as a result of filling the internal volume of the cap assemblies with uncured sealant. There is also a need to provide a cap assembly in which uncured sealant expansion has minimal or no lift off effect to a cap assembly installed on a structure.

SUMMARY

An example includes a containment cap assembly for enclosing a metallic fastener extending through a structure which includes an inner cap having a projection extending from an outer surface of the inner cap. The containment cap assembly further includes an outer cap which includes a sidewall having a first end which defines an opening and an inner surface which defines a first space wherein the opening is in communication with the first space. A dimension of the opening and a dimension of the first space defined by the inner surface of the outer cap are each greater than a dimension defined by the outer surface of the inner cap such that with positioning the inner cap within the outer cap, a second space is defined between the inner surface of the sidewall of the outer cap and the outer surface of the inner cap. A slot defined by the inner surface of the outer cap extends along the inner surface away from the first end of the outer cap in a first curvilinear direction relative to the first end wherein with the projection positioned within the slot and the inner cap moved into the outer cap, the projection moves in the first curvilinear direction within the first slot.

An example includes a method for enclosing a metallic fastener extending through a structure with a containment cap assembly which includes a step of positioning uncured sealant into an outer cap, wherein the outer cap includes a sidewall having an inner surface which defines a first space and a first end which defines an opening wherein the opening is in communication with the first space. A dimension of the opening and a dimension of the first space defined by the inner surface of the outer cap are each greater than a dimension defined by an outer surface of an inner cap such that with positioning the inner cap within the outer cap a second space is defined between the inner surface of the outer cap and the outer surface of the inner cap. A slot defined by the inner surface of the outer cap extends along the inner surface away from the first end in a first curvilinear direction relative to the first end. The method further includes a step of positioning the inner cap over a metallic fastener extending from a structure wherein the inner cap includes a projection extending from the outer surface of the inner cap and a step of inserting the inner cap into the outer cap with the projection received by the slot which includes moving the projection along the slot in the first curvilinear direction and displacing the uncured sealant positioned within the second space.

The features, functions, and advantages that have been discussed can be achieved independently in various embodiments or may be combined in yet other embodiments further details of which can be seen with reference to the following description and drawings.

DESCRIPTION

Figure 1:
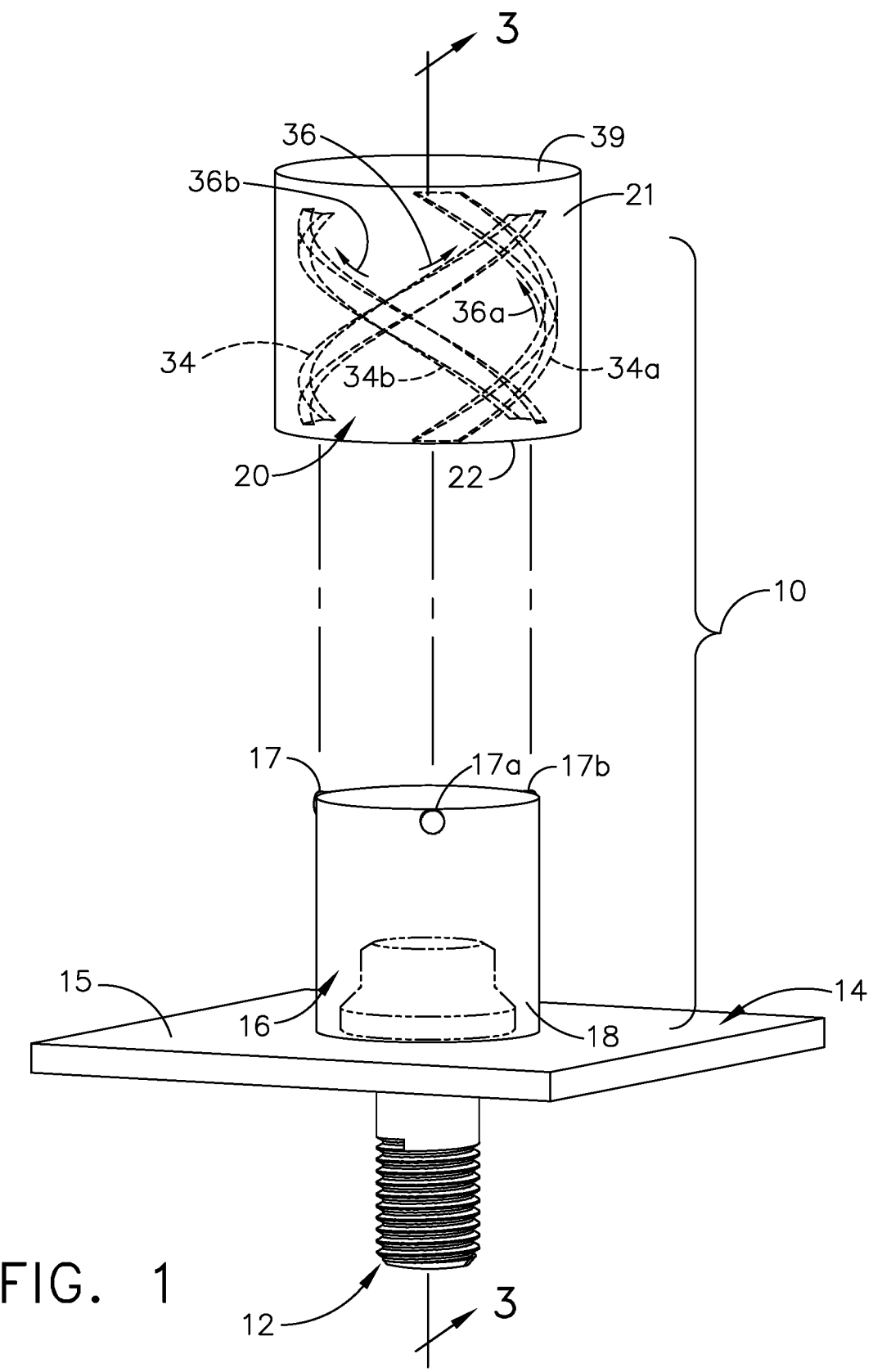
FIG. 1 an exploded perspective view of the cap assembly with an inner cap of the cap assembly enclosing a metallic fastener.
Figure 2:
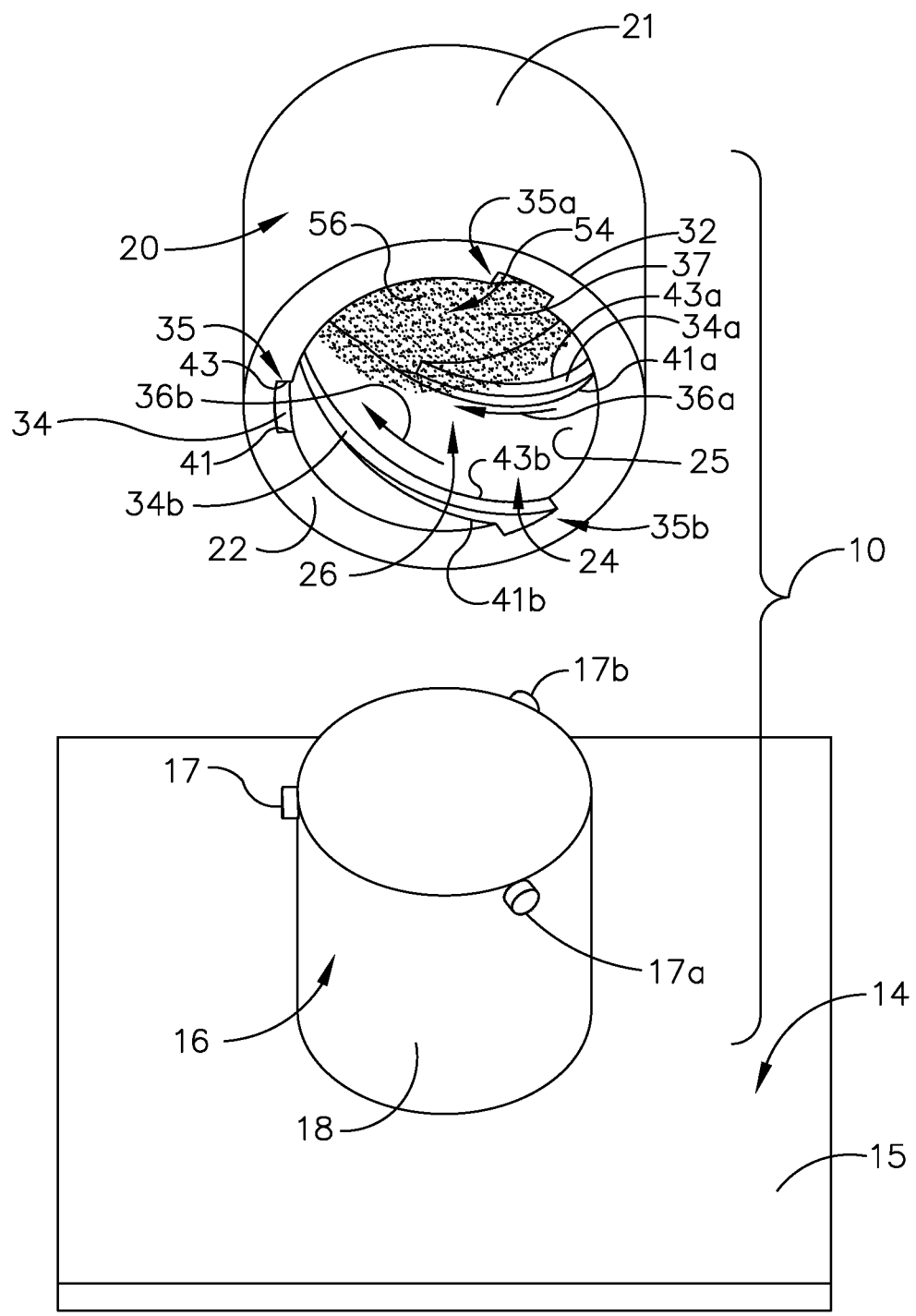
FIG. 2 is an exploded view of the containment cap assembly of FIG. 1 with a bottom perspective view of an outer cap of the cap assembly.
Figure 3:
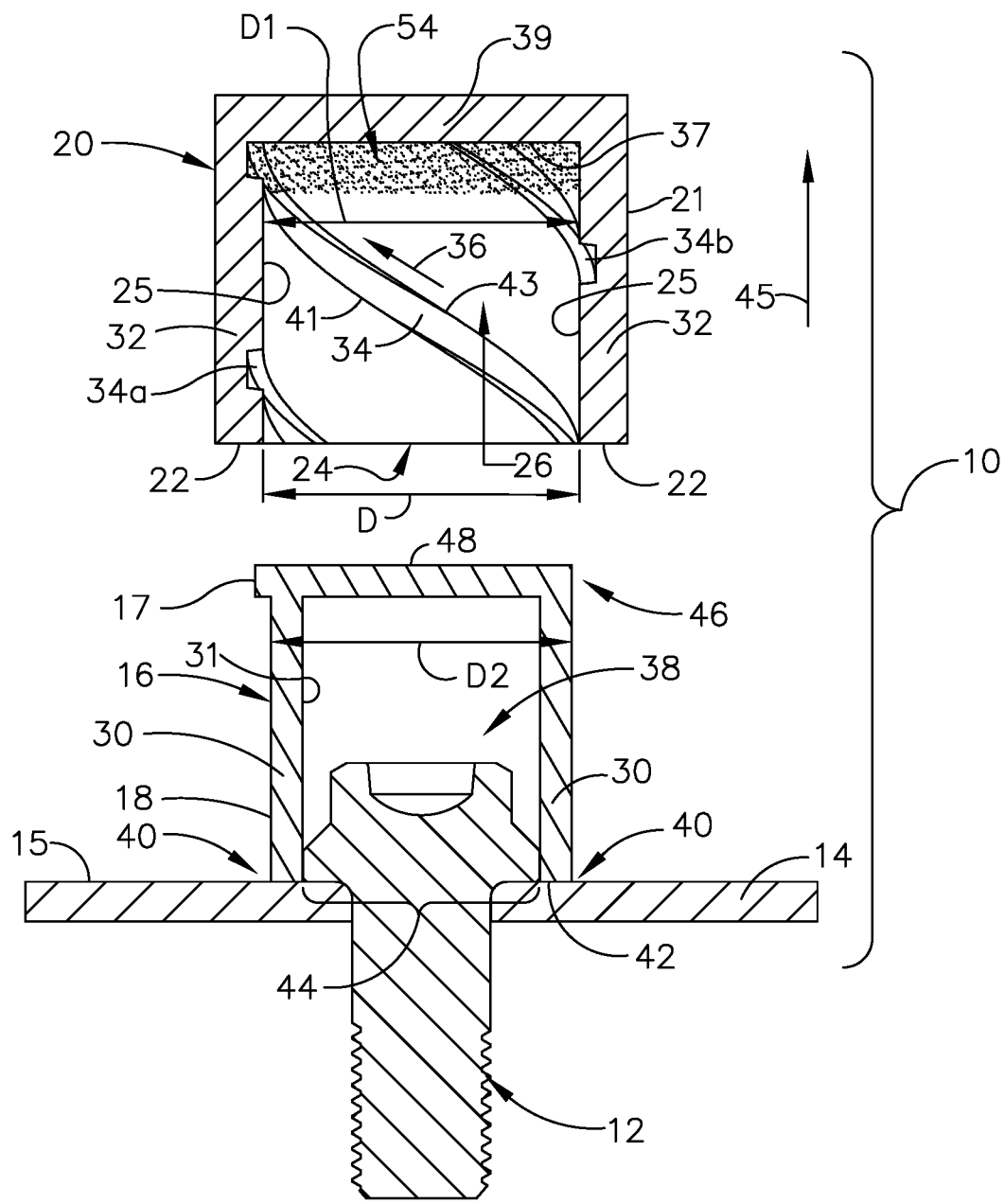
FIG. 3 is a cross section view of the containment cap assembly along line 3-3 of FIG. 1 with outer cap in an installed orientation as seen in FIG. 5.
Figure 4:
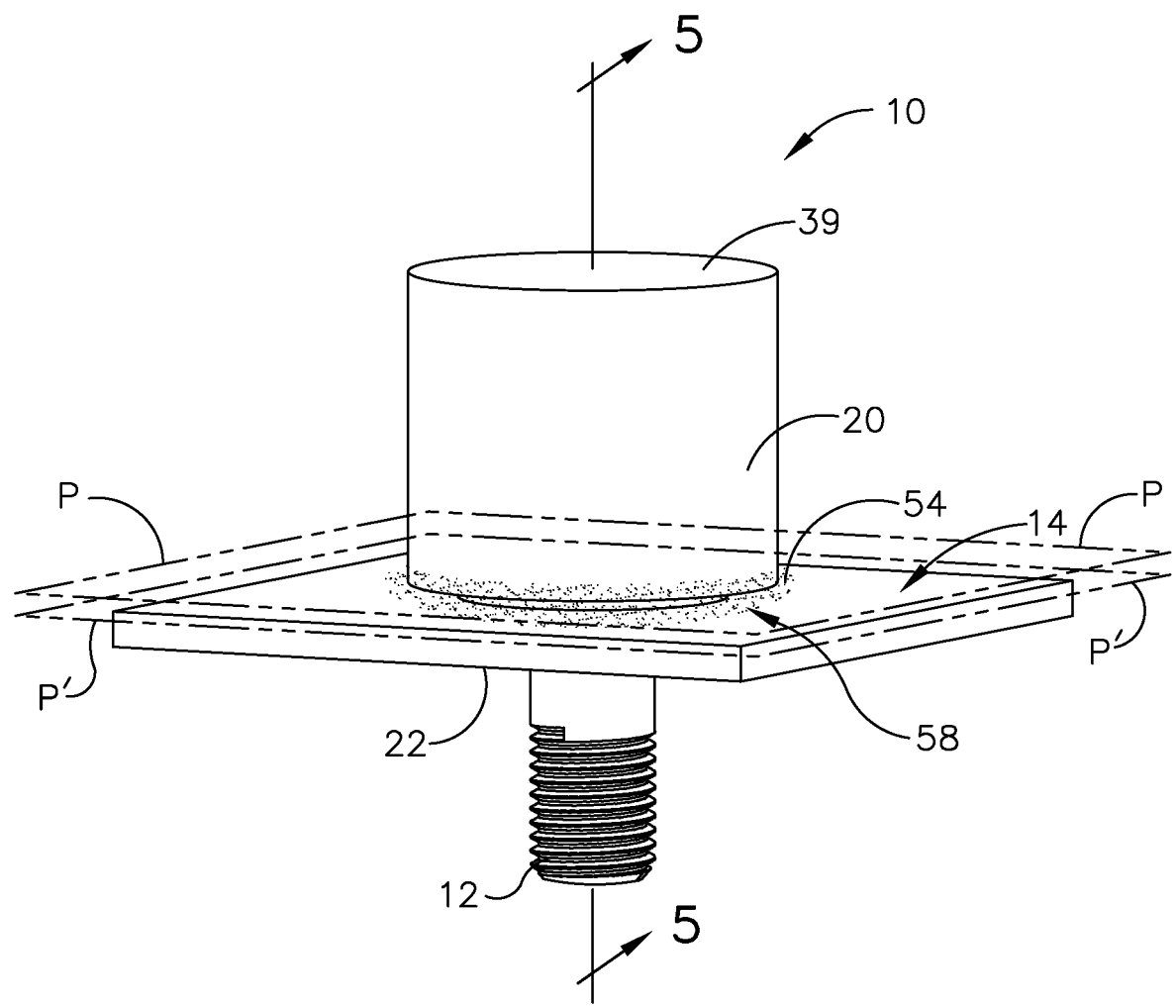
FIG. 4 is a perspective view of the containment cap assembly of FIG. 1 assembled and installed with squeeze out uncured sealant positioned about the cap assembly.
Figure 5:
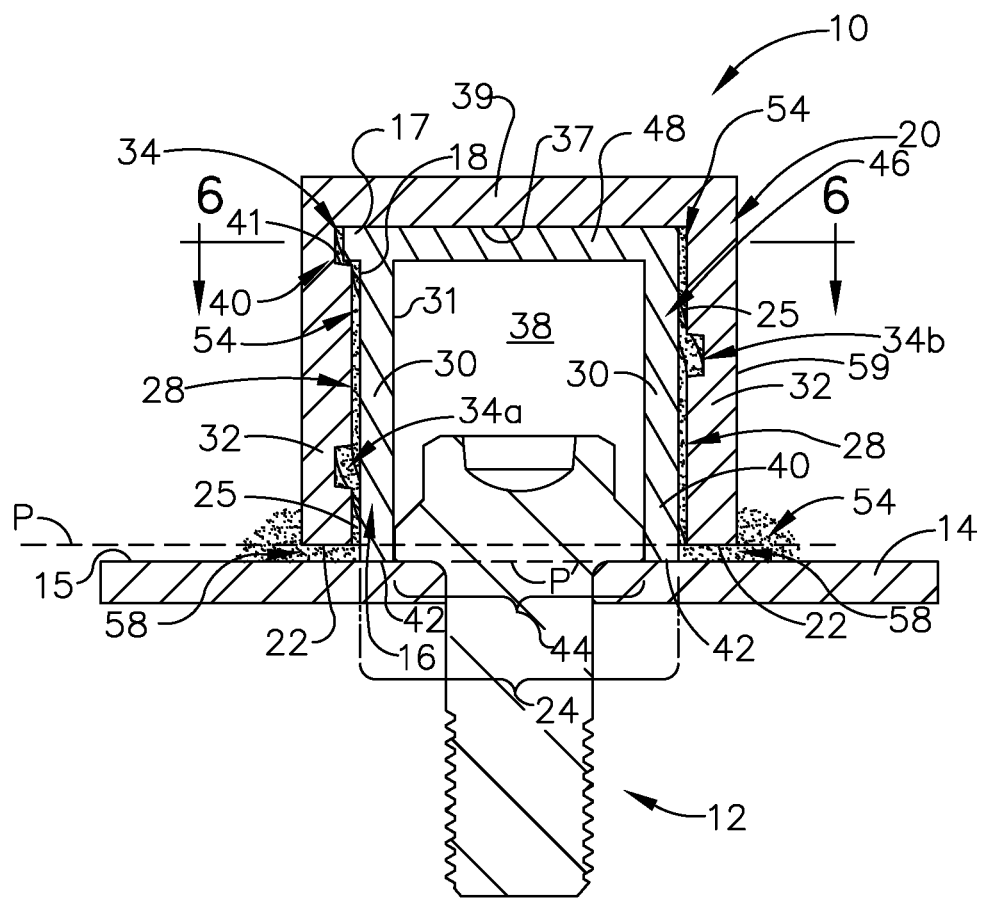
FIG. 5 is the containment cap assembly of FIG. 3 assembled and installed.

In referring to FIGS. 1-3, containment cap assembly 10 encloses a metallic fastener 12, which extends through structure 14, for electrically isolating metallic fastener 12 from a vicinity in which metallic fastener 12 is located within structure 14. Electrically isolating metallic fastener 12 protects the vicinity by insulating the metallic fastener from transmitting any current or electrical spark from metallic fastener 12 into the vicinity, such as within an aircraft, upon an occurrence of an electromagnetic effect ("EME") or lightning strike event. Containment cap assembly 10 includes inner cap 16, which encloses a portion of metallic fastener 12 to be contained within an enclosure of inner cap 16 and structure 14, as seen in FIG. 3. Inner cap 16 also includes, as will be further discussed herein, projection 17, which extends from outer surface 18 of inner cap 16. Containment cap assembly 10 also includes outer cap 20, which includes, as seen in FIG. 2, sidewall 21 having a first end 22 which defines opening 24 and inner surface 25, which defines first space 26. Inner surface 25 extends from first end 22 and into outer cap 20 defining first space 26 within outer cap 20. Opening 24 is in communication with first space 26, which provides access and positioning of inner cap 16 into first space 26, as seen in FIG. 5. Inner cap 16 and outer cap 20 can be constructed from one of a wide variety of non-electrical conductive materials and in this example are constructed of a thermoplastic material.

In referring to FIG. 3, dimension D of opening 24 of outer cap 20 and dimension D1 of first space 26 defined by inner surface 25 of outer cap 20 are each greater than dimension D2 defined by outer surface 18 of inner cap 16. With dimensions D and D1 being greater than dimension D2, inner cap 16 can be positioned within outer cap 20, as seen in FIG. 5, such that second space 28 is defined between inner surface 25 of sidewall 32 of outer cap 20 and outer surface 18 of sidewall 30 of inner cap 16. In inserting inner cap 16 within outer cap 20, projection 17 of inner cap 16 is inserted within slot 34 at opening 35 defined by first end 22 of outer cap 20, as seen in FIG. 2.

Slot 34 defined by inner surface 25 of outer cap 20 extends along inner surface 25 of outer cap 20 away from first end 22 in curvilinear direction 36 relative to first end 22. In this example, curvilinear direction 36 is in a helical direction. In this example, with projection 17 positioned within slot 34 and inner cap 16 moved into outer cap 20, a seen in FIG. 5, projection 17 moves in curvilinear direction 36 within slot 34, as seen in FIGS. 2, 3 and 5 until projection 17, in this example, reaches and abuts inner surface 37 of end wall 39 of outer cap 20. End wall 39 of outer cap 20 can be one of a variety of shapes. In this example, end wall 39 has a flat configuration and other examples of end wall 39 can include a dome configuration or other desired shape. With projection 17 moving along curvilinear direction 36, outer cap 20 turns relative to inner cap 16. Projection 17 can be constructed in one of a variety of shapes such that projection 17 can engage slot 34 and follow curvilinear direction 36 of slot 34.

Slot 34, as seen in FIGS. 2, 3 and 5, have opposing sidewalls 41 and 43, which confine projection 17 within slot 34. In this example, sidewall 41, as seen in FIG. 3, extends in curvilinear direction 36 and blocks projection 17 from moving directly toward first end 22 of outer cap 20. Sidewall 41, upon an occurrence of expansion of uncured sealant 54 positioned within second space 28, as seen in FIG. 5, blocks and resists lift off of outer cap 20 in direction 45, as seen in FIG. 3. In addition, uncured sealant 54 positioned within slot 34, which was displaced within second space 28 with the insertion of inner cap 16 into outer cap 20 containing uncured sealant 54 as seen in FIG. 3, provides resistance of movement of projection 17 within slot 34. The insertion of inner cap 16 into outer cap 20, as seen in FIG. 5, displaces uncured sealant 54 within second space 28 toward first end 22 of outer cap 20 and uncured sealant 54 is moved into and along slot 34 positioned along second space 28. As a result, the angular position of sidewall 41 of slot 34 relative to first end 22 of outer cap 20 and uncured sealant 54 displaced into slot 34 resists projection 17 from moving directly toward first end 22 of outer cap 20 with a lift off force applied to outer cap 20 from expansion of uncured sealant 54 exerted in direction 45.

As seen in FIG. 2, first end 22 of sidewall 32 of outer cap 20 defines opening 35 which is aligned with and in communication with slot 34. In this example, additional projections are positioned extending from outer surface 18 of inner cap 16 and additional corresponding slots are positioned and defined along inner surface 25 of outer cap 20. Second projection 17a and third projection 17b extend from outer surface 18 of inner cap 16, wherein second projection 17a is positioned spaced apart about inner cap 16 from projection 17 and third projection 17b is positioned spaced apart about inner cap 16 from projection 17a and projection 17. This example, as seen in FIGS. 2, 3, 5 and 6, further includes second slot 34a defined by inner surface 25 of outer cap 20 which extends along inner surface 25 away from first end 22 in second curvilinear direction 36a relative to first end 22 of outer cap 20 having opposing sidewalls 41a and 43a. Similarly this example also includes third slot 34b defined by inner surface 25 of outer cap 20 which extends along inner surface 25 away from first end 22 in third curvilinear direction 36b relative to first end 22 of outer cap 20 having opposing sidewalls 41b and 43b. Curvilinear directions 36, 36a and 36b in this example extend generally parallel to one another along inner surface 25 of outer cap 20.

First end 22 of sidewall 32 of outer cap 20 defines second opening 35a which is aligned with and in communication with second slot 34a and first end 22 of sidewall 32 of outer cap 20 also defines third opening 35b which is aligned with and in communication with third slot 34b. All three projections 17, 17a and 17b are inserted into opening 35, second opening 35a and third opening 35b respectively and continued insertion of inner cap 16 into outer cap 20 results in projections 17, 17a and 17b moving along slots 34, 34a and 34b respectively. Second slot 34a is spaced from slot 34 about inner surface 25 of outer cap 20 and third slot 34b is spaced apart from second slot 34a and slot 34 about inner surface 25. In this example, second curvilinear direction of second slot 34a extends in a helical direction such as does slot 34 and third slot 34b. With projection 17, second projection 17a and third projection each positioned within slot 34, second slot 34a and third slot 34b respectively and inner cap 16 is inserted into outer cap 20, projection 17, second projection 17a and third projection 17b move in the curvilinear direction 36, second curvilinear direction 36a and third curvilinear direction 36b respectively within second slot 34, second slot 34a and third slot 34b respectively. With projection 17, second projection 17a and third projection 17b each moving in curvilinear direction 36, second curvilinear direction 36a and third curvilinear direction 36b respectively, outer cap 20 turns relative to inner cap 16. Outer cap 20 is installed with end wall 39 of outer cap 20 in abutting relationship with end wall 48 of inner cap 16 as seen in FIG. 5.

Figure 6:
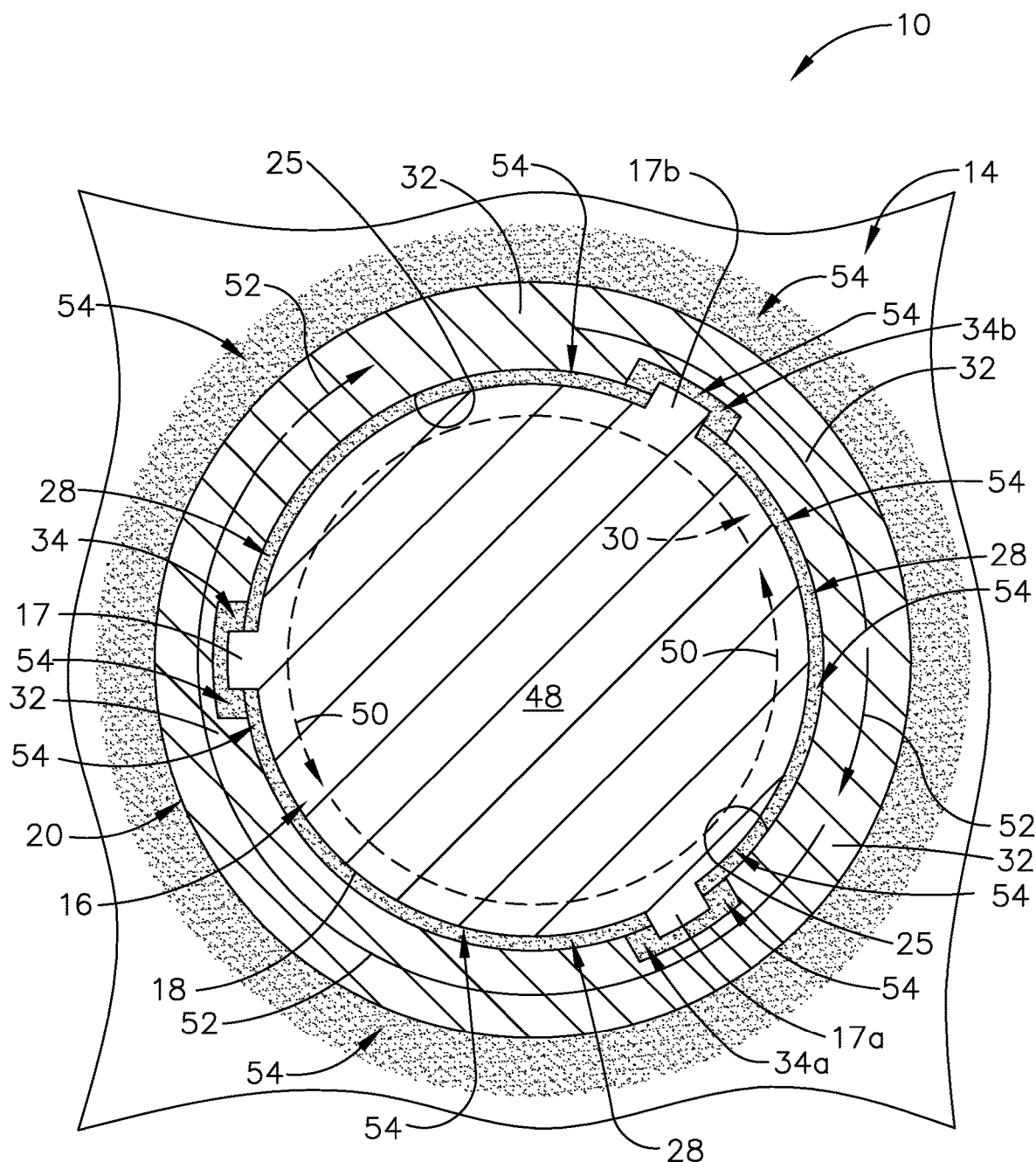
FIG. 6 is a cross section view of the containment cap assembly along line 6-6 of FIG. 5.
Figure 7:
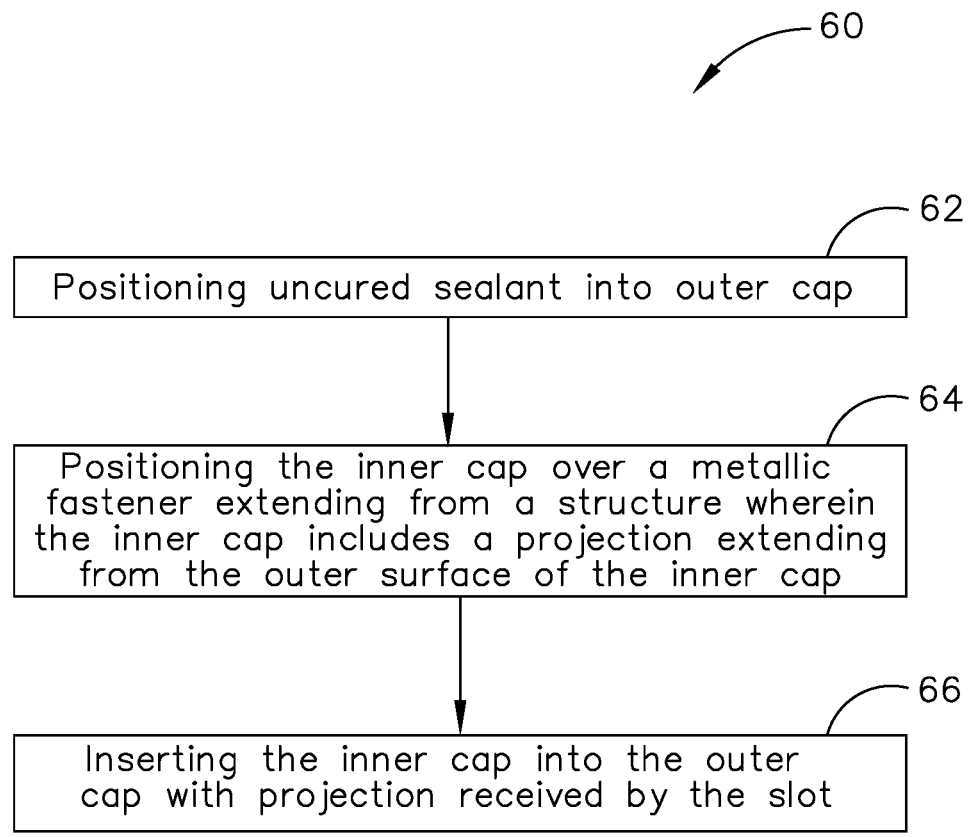
FIG. 7 is a flow chart of a method for enclosing a metallic fastener extending through a structure utilizing a containment cap assembly.

As seen in FIGS. 3 and 5, inner cap 16 includes sidewall 30 having an inner surface 31 which defines third space 38 and first end portion 40 of sidewall 30 includes first end 42. First end 42 defines opening 44 in communication with third space 38 for receiving at least a portion of the metallic fastener 12 within third space 38. Opposing second end portion 46 of sidewall 30 includes end wall 48 secured to sidewall 30. In this example of containment cap assembly 10, cross section of the inner cap 16 includes sidewall 30 defining circular configuration 50, as seen in FIG. 6. Similarly, cross section of outer cap 20 includes sidewall 32 also defining circular configuration 52. Circular configuration optimizes the occupation of space with respect to structure 14 in enclosing metallic fasteners 12 and provides outer cap 20 to rotate about and relative to inner cap 16.

Containment cap assembly 10 includes uncured sealant 54, as mentioned earlier, positioned within outer cap 20, as seen in FIGS. 2-3. With inner cap 16 positioned within outer cap 20, uncured sealant 54 is displaced within second space 28 between outer surface 18 of inner cap 16 and inner surface 25 of outer cap 20, as seen in FIG. 5. Uncured sealant 54 is also displaced into slot 34 and in this example, into second slot 34a and also into third slot 34b. As seen in FIG. 5, with end wall 39 secured to sidewall 32 of outer cap 20 positioned against end wall 48 of inner cap 16, sidewall 32 of outer cap 20 positions first end 22, which defines first plane P, spaced apart from second plane P' defined by first end 42 of inner cap 16 which abuts structure 14. With first end 42 of inner cap 16 positioned on surface 15 of structure 14, first end 22 of outer cap 20 defines gap 58 between outer cap 20 and surface 15 of structure 14, which extends about inner cap 16. With end wall 48 of inner cap 16 abutting end wall 39 of outer cap 20, uncured sealant 54, as originally positioned within outer cap 20 as seen in FIGS. 2 and 3 of containment cap assembly 10, is displaced within and along second space 28 and into and along slot 34, second slot 34a and third slot 34b, toward first end 22 of outer cap 20. Uncured sealant 54 from within second space 28 moves through gap 58 between first end 22 of sidewall 32 of outer cap 20 and structure 14 and extrudes from gap 58.

With a measured amount of uncured sealant positioned in outer cap 20, the amount of uncured sealant extruding through gap 58 can be controlled. The uncured sealant 54 that is extruded is smoothed out and further seals second space 28 closed without a need for having installer provide additional sealant for installation. In the present example, outer cap 20 can be provided to installer with a measured amount of uncured sealant 54 positioned within outer cap 20. With containment cap assembly 10 installed, uncured sealant 54 for containment cap assembly 10 is positioned within a limited volume of second space 28 positioned between inner cap 16 and outer cap 20. There is no need to fill a complete volume defined by inner cap 16 or outer cap 20. As a result, sealing of metallic fastener 12 is accomplished with a reduced amount of uncured sealant 54. Utilization of a relatively lesser amount of uncured sealant 54 reduces the weight of securement of containment cap assembly 10 and provides less operational cost with use of containment cap assembly 10 in association with, for example, an aircraft assembly. Additionally, further installation costs are saved with minimizing reworking a containment cap assembly 10 installation which would otherwise be incurred as a result of uncured sealant 54 expansion. The above described operation of projection 17 with respect to slot 34 restricts outer cap 20 lift off movement relative to inner cap 16 and reduces an occurrence of lift off of outer cap 20 from inner cap 16.

Method 60 for enclosing metallic fastener 12 extending through structure 14 with containment cap assembly 10 includes step 62 of positioning uncured sealant 54 into outer cap 20, wherein outer cap 20 includes sidewall 32 having inner surface 25, which defines first space 26 and first end 22, which defines opening 24. Opening 24 is in communication with first space 26. Outer cap 20 further includes dimension D of opening 24 and dimension D1 of first space 26 defined by inner surface 25 of outer cap 20, which are each greater than dimension D2 defined by outer surface 18 of inner cap 16 such that with positioning inner cap 16 within outer cap 20, second space 28 is defined between inner surface 25 of outer cap 20 and outer surface 18 of inner cap 16, as seen in FIG. 5. Slot 34 defined by inner surface 25 of outer cap 20 extends along inner surface 25 away from first end 22 in curvilinear direction 36 relative to first end 22. Method 60 further includes step 64 of positioning inner cap 16 over metallic fastener 12 extending from structure 14 wherein inner cap 16 includes projection 17 extending from outer surface 18 of inner cap 16. Method 60 further includes step 66 of inserting inner cap 16 into outer cap 20 with projection 17 received by slot 34, which includes moving projection 17 along slot 34 in curvilinear direction 36 and includes displacing uncured sealant 54 positioned within second space 28.

Step 66 of inserting inner cap 16 further includes moving projection 17 from first end 22 of outer cap 20 to inner surface 37 of end wall 39, secured to sidewall 32, of outer cap 20 wherein outer cap 20 turns relative to inner cap 16. Step 66 of inserting inner cap 16 further includes displacing uncured sealant 54 toward first end 22 of outer cap 20 and includes moving uncured sealant 54 to within gap 58 defined by first end 22 of sidewall 32 of outer cap 20 and structure 14. Step 66 of inserting further includes extruding uncured sealant 54 from gap 58 along structure 14 and beyond outside surface 59 of outer cap 20. Uncured sealant 54 positioned outside of outer cap 20 can be smoothed out by the installer further sealing closed second space 28 and securing outer cap 20 to inner cap 16 and securing both inner cap 16 and outer cap 20 to structure 14.

While various embodiments have been described above, this disclosure is not intended to be limited thereto. Variations can be made to the disclosed embodiments that are still within the scope of the appended claims.

What is claimed:

1. A containment cap assembly for enclosing a metallic fastener extending through a structure, comprising:
    an inner cap including a projection extending from an outer surface of the inner cap; and
    an outer cap comprising:
        a sidewall having a first end which defines an opening and an inner surface which defines a first space, wherein:
            the opening is in communication with the first space;
            a dimension of the opening and a dimension of the first space defined by the inner surface of the outer cap are each greater than a dimension defined by the outer surface of the inner cap such that with positioning the inner cap within the outer cap, a second space is defined between the inner surface of the sidewall of the outer cap and the outer surface of the inner cap; and
        a slot defined by the inner surface of the outer cap which extends along the inner surface away from the first end of the outer cap in a first curvilinear direction relative to the first end wherein with the projection positioned within the slot and the inner cap moved into the outer cap, the projection moves in the first curvilinear direction within the slot.

2. The containment cap assembly of claim 1, wherein the inner cap and outer cap are constructed of a thermoplastic material.

3. The containment cap assembly of claim 1, wherein:
    the inner cap includes a sidewall having an inner surface which defines a third space;

a first end portion of the sidewall of the inner cap includes a first end which defines an opening in communication with the third space for receiving at least a portion of the metallic fastener within the third space; and an opposing second end portion of the sidewall of the inner cap includes an end wall secured to the sidewall.

4. The containment cap assembly of claim 3, wherein a cross section of the inner cap includes the sidewall defining a circular configuration.

5. The containment cap assembly of claim 4, wherein a cross section of the outer cap defines a circular configuration.

6. The containment cap assembly of claim 3, further includes an uncured sealant positioned within the outer cap such that with the inner cap positioned within the outer cap the uncured sealant is displaced within the second space between the outer surface of the inner cap and the inner surface of the outer cap.

7. The containment cap assembly of claim 6, wherein with an end wall secured to the sidewall of the outer cap positioned against the end wall of the inner cap, the first end of the sidewall of the outer cap defines a first plane and is spaced apart from a second plane defined by the first end of the inner cap.

8. The containment cap assembly of claim 7, wherein with the first end of the inner cap positioned on the structure, the first end of the outer cap defines a gap between the outer cap and the structure which extends about the inner cap.

9. The containment cap assembly of claim 8, wherein uncured sealant which is displaced within the second space moves to and through the gap between the first end of the sidewall of the outer cap and the structure and extrudes from the gap.

10. The containment cap assembly of claim 1, wherein the first curvilinear direction extends in a helical direction.

11. The containment cap assembly of claim 1, wherein the first end of the sidewall of the outer cap defines an opening which is in communication with the slot.

12. The containment cap assembly of claim 1, further includes a second slot defined by the inner surface of the outer cap which extends along the inner surface away from the first end in a second curvilinear direction relative to the first end.

13. The containment cap assembly of claim 12, wherein the second slot is spaced from the slot about the inner surface of the outer cap.

14. The containment cap assembly of claim 12, wherein the second curvilinear direction of the second slot extends in a helical direction.

15. The containment cap assembly of claim 12, further includes a second projection extending from the outer surface of the inner cap such that with the second projection positioned within the second slot and the inner cap moved into the outer cap, the second projection moves in the second curvilinear direction within the second slot.

16. A method for enclosing a metallic fastener extending through a structure with a containment cap assembly, comprising the steps of:

positioning uncured sealant into an outer cap, wherein the outer cap comprises:
  a sidewall having an inner surface which defines a first space and a first end which defines an opening wherein the opening is in communication with the first space;
  a dimension of the opening and a dimension of the first space defined by the inner surface of the outer cap are each greater than a dimension defined by an outer surface of an inner cap such that with positioning the inner cap within the outer cap a second space is defined between the inner surface of the outer cap and the outer surface of the inner cap; and
  a slot defined by the inner surface of the outer cap which extends along the inner surface away from the first end in a first curvilinear direction relative to the first end, positioning the inner cap over a metallic fastener extending from a structure wherein the inner cap includes a projection extending from the outer surface of the inner cap; and inserting the inner cap into the outer cap with the projection received by the slot, includes:
  moving the projection along the slot in the first curvilinear direction; and
  displacing the uncured sealant positioned within the second space.

17. The method of claim 16, the step of inserting the inner cap further includes moving the projection from the first end of the outer cap to an inner surface of an end wall, secured to the sidewall of the outer cap, wherein the outer cap turns relative to the inner cap.

18. The method of claim 16, wherein the step of inserting the inner cap further includes displacing the uncured sealant toward the first end of the outer cap.

19. The method of claim 18, wherein the step of inserting further includes moving the uncured sealant to within a gap defined by the first end of the sidewall of the outer cap and the structure.

20. The method of claim 19, wherein the step of inserting further includes extruding the uncured sealant from the gap along the structure and beyond an outside surface of the outer cap.

* * * * *